June 20, 1961  E. STOLL  2,989,172
WIRE BOX ASSEMBLY
Filed July 3, 1958  2 Sheets-Sheet 1
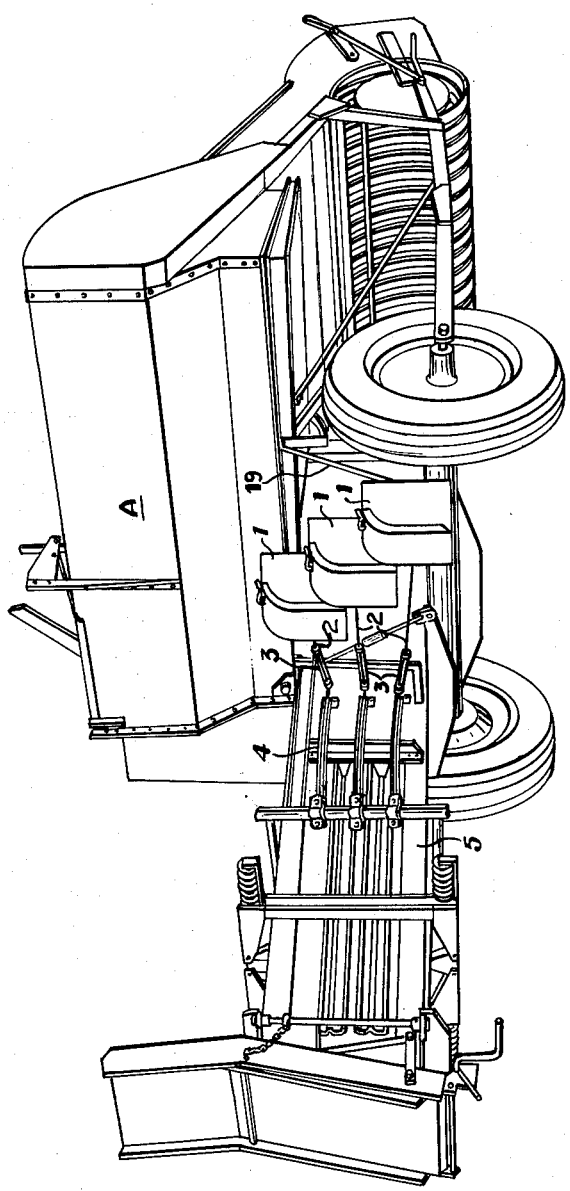
INVENTOR.
EMIL STOLL
BY
J. Shore

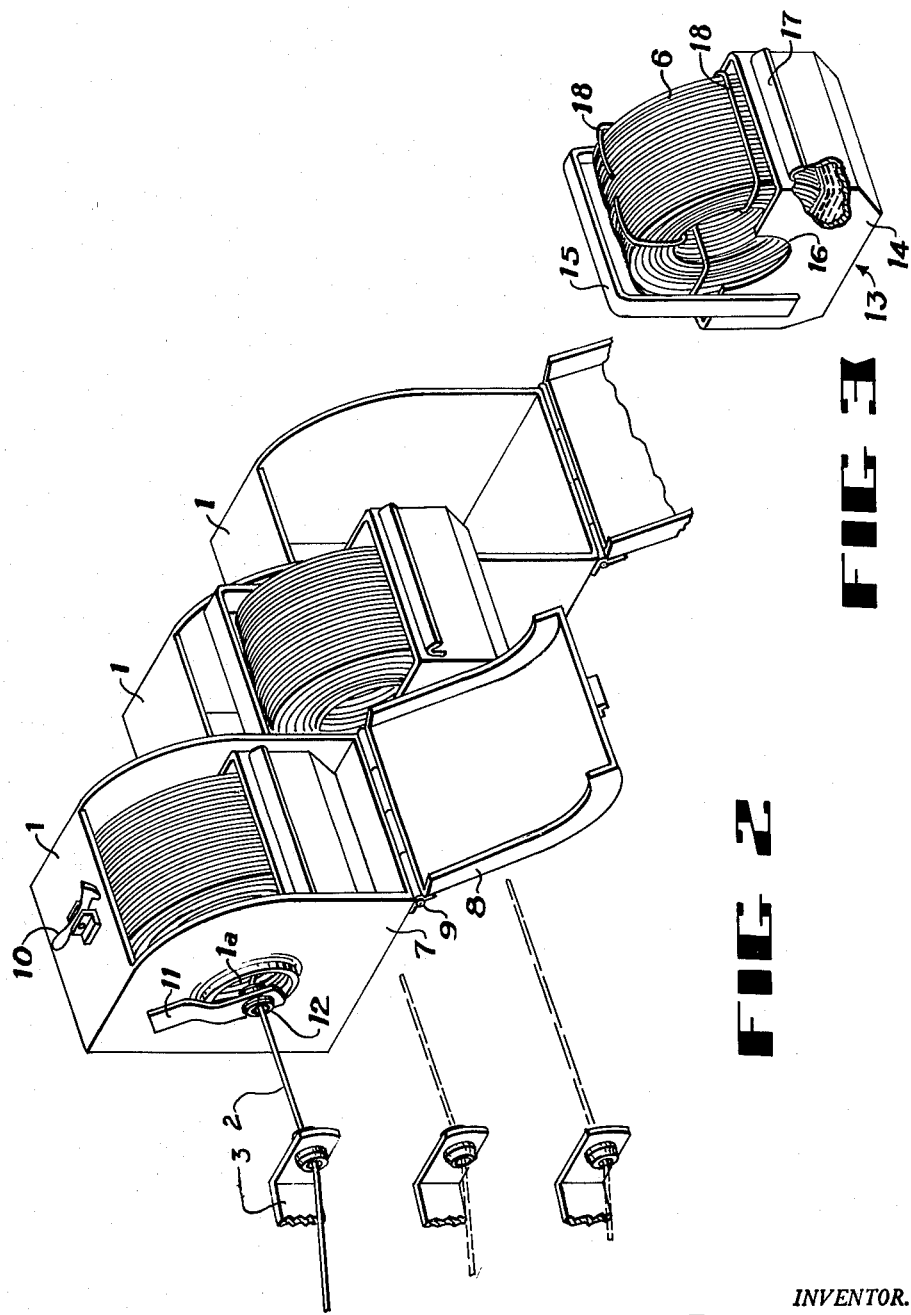

United States Patent Office 2,989,172
Patented June 20, 1961

2,989,172
WIRE BOX ASSEMBLY
Emil Stoll, Racine, Wis., assignor to J. I. Case Company, Racine, Wis., a corporation of Wisconsin
Filed July 3, 1958, Ser. No. 746,526
2 Claims. (Cl. 206—1)

This invention relates to hay balers or other machinery using coils of wire, and particularly to a wire box assembly located on the machinery, which wire box serves as a storage receptacle for the wire being used.

In machinery using coils of wire such as a hay baler, it has been common practice to use a wire box arrangement consisting of a box in which a coil of wire is loosely placed. The coil is normally prevented from unraveling during installation by securing wires that are subsequently cut and removed after the coil is placed in the wire box. This operation is cumbersome since the coil of wire is often bulky and difficult to manage, with the result that the coil may become unwound or snarled. Also, if it becomes necessary to remove the coil of wire from the box, the turns of the coil must be refastened and again the possibility of unwinding and snarling of the coil exists. In addition, previous wire boxes had doors which were hinged at the top which further complicated the handling of the wire coils since the doors had to be held open while the coils were being inserted.

In addition to the aforementioned difficulty in handling the coils, there is also a problem in providing adequate lubrication for the wire to facilitate the drawing of the wire through the bales. When the wire is merely placed in a box, as in prior practice, the oil is drained from the wire box by either bodily removing the box, or draining the oil from the box in some fashion which could consume appreciable time and effort.

Accordingly, it is an object of this invention to provide a wire box assembly in which a wire coil can be quickly and easily loaded and unloaded relative to a wire box.

A further object is to provide a wire holder which supports a coil of wire against unraveling or snarling during insertion and removal of the coil relative to a wire box.

A further object is to provide a wire holder which can be easily handled, and one in which lubricant can be readily supplied to and drained therefrom when lubrication of the coils is desired.

Other objects and advantages will be apparent from the following description and drawings in which:

FIG. 1 is a view in perspective taken from the rear of a baler showing a plurality of wire box assemblies mounted thereon;

FIG. 2 is an enlarged perspective view of the wire box assemblies showing the wire holder in various states of insertion into the various wire boxes; and FIG. 3 is a perspective view, partially broken away, of a wire holder containing a coil of wire.

Generally stated, the invention relates to a wire box assembly mounted on a hay baler or other machine using coils of wire, which assembly comprises a box for receiving a wire holder in which the wire is located. The wire holder provides a receptacle for lubricant and also includes handle means which permits ready insertion and removal of the wire holder.

Referring now to FIG. 1, it can be seen that there is disclosed a conventional baler A including three substantially identical wire boxes 1 secured to a baler frame member 19. The wires 2 leading from the wire boxes 1 are directed to wire guides 3, after which they are picked up by needles 4 when the needles are actuated in well-known manner by a typing mechanism (not shown) for binding a bale located in the baling chamber 5.

Referring now to FIG. 2, the wire boxes 1 are shown in greater detail and they each consist of a box 7 which can be closed by an upwardly swinging door 8, hinged at 9. The doors 8 are retained in the closed position by engagement with lock mechanism 10, secured to the top of the boxes 1. Each of the boxes 1 includes an opening 1a in the side thereof through which the wire 2 is directed to the wire guide 3. An additional guide 11 including a cylindrical guide member 12 is welded to the side of the box 1 for guiding the wire immediately after it leaves the wire box 1.

Each coil of wire 6 is placed in an auxiliary wire holder 13 as shown in FIG. 3. The auxiliary wire holder consists of a substantially rectangular basket-like receptacle 14 which is open at the top for receiving the wire coil 6. A bale-like handle 15 is secured to the outer sides of the basket 14 for easy handling of the wire holder. The basket portion 14 can be made oil tight for retaining a lubricant therein if such is desired for oiling the wire for ease in drawing the wire through the hay being baled. Receptacle 14 also includes an opening 16 in the side thereof for facilitating withdrawal of the wire from the box 1. The wire is withdrawn from the inside of the coil for ease in unraveling the wire. In addition to handle 15, a second handle portion 17 is secured to the front of the wire holder 13 to aid in handling the wire holder relative to the wire box 1. It should be noted at this time, that handle 15 is of such a height and so located with respect to coil 6 in the basket 14 that it functions to aid in the retention of the coil in place in the wire holder by serving as a support for the top and sides of the coil after the fastening wires 18 are removed from the coil. In addition, with a wire holder of this design, any lubricant that is used can be readily drained and replaced by merely tilting the wire holder.

Thus it can be seen that there is provided a wire box assembly including a wire box and an auxiliary wire holder for retaining a coil of wire, which auxiliary wire holder can be loaded and unloaded from a hay baler or the like with ease and without danger of unraveling or snarling the wire coils. Furthermore, it is apparent that by hinging the door 8 at the bottom of the box 7, the bulky and heavy coils of wire can be handled by one man.

While only one specific embodiment has been described herein, it will be apparent that many changes and substitutions of equivalents may be made without departing from the invention. For example, the wire holder is not limited to the specific design disclosed but can be made of other shapes and include other handle means. Also, the wire box can take other configurations if desired within the scope of the invention.

It is, of course, intended to cover by the appended claims all such modifications as fall within the true scope and spirit of the invention.

What I claim as new and desire to be secured by Letters Patent is:

1. In a baler having a plurality of wire box assemblies secured thereto and adapted to contain baling wire for tying baled material, the improvement comprising a wire box assembly which includes a wire box and a wire holder located therein, said wire box having a hinged door secured thereto, the wire holder having a receptacle portion adapted to receive a coil of wire, a bale-like handle portion secured to the receptacle portion and constructed and arranged for retaining the coil of wire in said receptacle portion, whereby the wire box may be conveniently and readily opened by means of the hinged door, and the coil of wire may be easily placed and adequately retained in the wire holder without becoming snarled and unraveled.

2. In a baler having a plurality of wire box assemblies secured thereto and adapted to contain baling wire for tying baled material, the improvement comprising a wire box assembly which includes a wire box and a wire holder located therein, said wire box having a hinged door secured thereto, lock means secured to the wire box and positioned to retain the hinged door in a closed position relative to said wire box, the wire holder having a receptacle portion adapted to receive a coil of wire, a first handle portion secured to the receptacle portion and constructed and arranged for retaining the coil of wire in said receptacle portion, a second handle portion secured to the wire holder at a point spaced from first handle portion and positioned to be readily accessible when said wire box hinged door is in an open position, whereby the wire holder may be conveniently and readily removed from the wire box by means of said handle portions and the coil of wire is retained in the wire holder without becoming snarled and unraveled.

References Cited in the file of this patent

UNITED STATES PATENTS

| | | |
|---|---|---|
| 170,140 | Whitney | Nov. 16, 1875 |
| 720,287 | Schmidt | Feb. 10, 1903 |
| 765,157 | Alexander | July 19, 1904 |
| 1,952,056 | Cook | Mar. 27, 1934 |
| 2,458,318 | Tufts | Jan. 4, 1949 |
| 2,477,059 | Hill | July 26, 1949 |